United States Patent [19]
Toro-Lira et al.

[11] Patent Number: 5,332,898
[45] Date of Patent: Jul. 26, 1994

[54] PRECISION MEASUREMENT USING PARTICLE BEAM DEVICES

[75] Inventors: Guillermo L. Toro-Lira, Sunnyvale; Robert Zmrzli, San Jose, both of Calif.

[73] Assignee: Metrologix, Santa Clara, Calif.

[21] Appl. No.: 75,515

[22] Filed: Jun. 14, 1993

[51] Int. Cl.⁵ .................. G01N 23/225; H01J 37/256
[52] U.S. Cl. ................................ 250/307; 250/310
[58] Field of Search ............................. 250/307, 310

[56] References Cited
U.S. PATENT DOCUMENTS

| | | | |
|---|---|---|---|
| 3,886,305 | 5/1975 | Yew et al. | 250/306 |
| 4,099,054 | 7/1978 | Okumura et al. | 250/310 |
| 4,907,287 | 3/1990 | Homma et al. | 250/310 |

Primary Examiner—Jack I. Berman
Attorney, Agent, or Firm—Burns, Doane, Swecker & Mathis

[57] ABSTRACT

The precision of measurements of feature dimensions of objects using a particle beam device is improved by setting upper and lower signal reference levels and a signal offset level, performing a preliminary scan of the object using the particle beam device to produce a time-quantized and level-quantized signal indicative of a surface profile of the object, determining a percentage of time intervals during which the signal lies outside a range defined by the upper and lower signal reference, levels, and processing the signal by adjusting at least one of the signal reference levels and the offset level such that the foregoing percentage becomes substantially equal to a predetermined percentage. In other words, the percentage of "outliers" in a profile, that is the number of pixels that exceed full scale in a video range, is limited to a predetermined percentage, for example one percent. Clipping distortion is therefore minimized. In another embodiment of the present invention, clipping distortion is minimized by performing profile synthesis using the median of multiple profiles instead of the arithmetic mean.

6 Claims, 5 Drawing Sheets

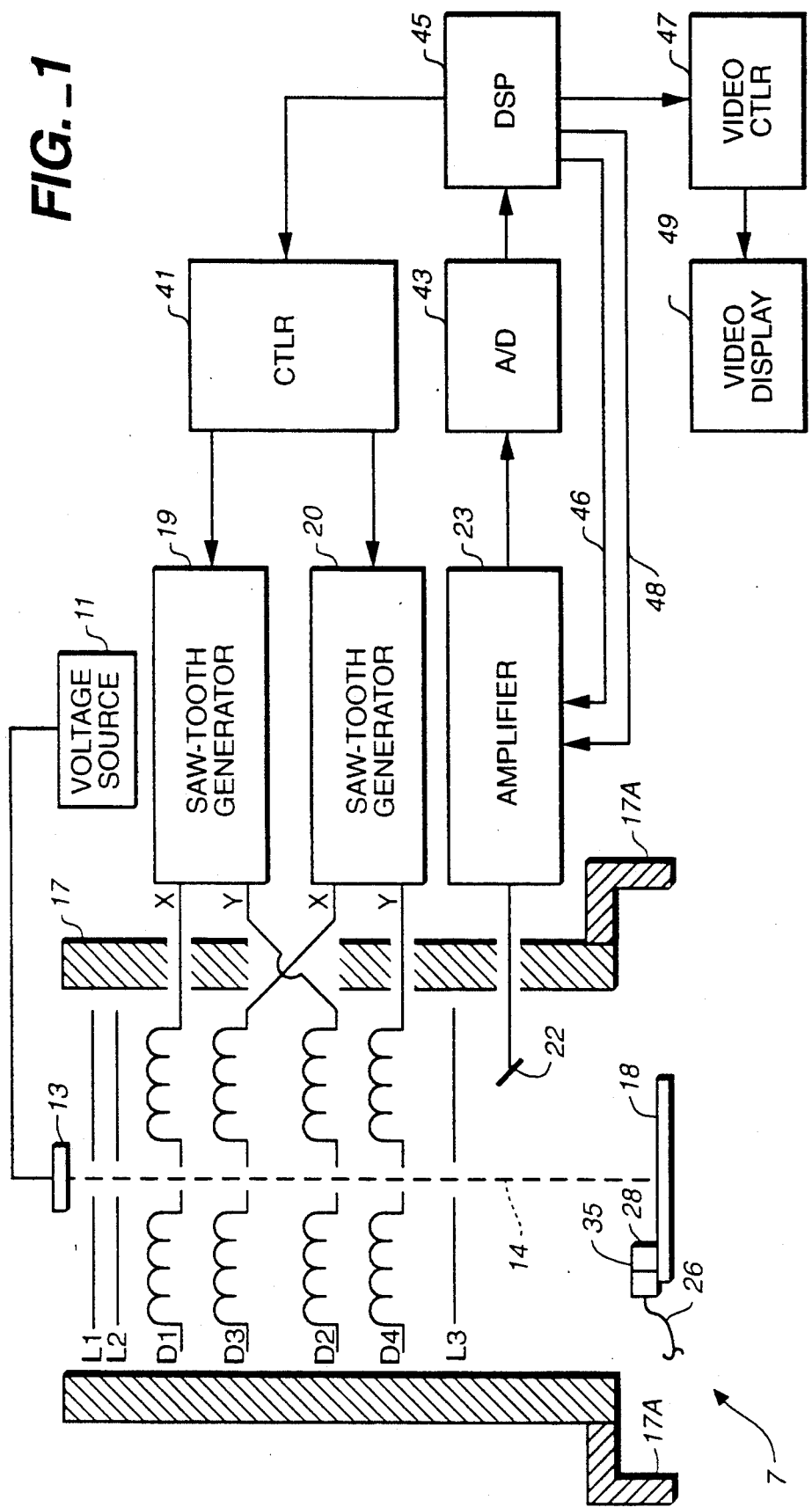
FIG._1

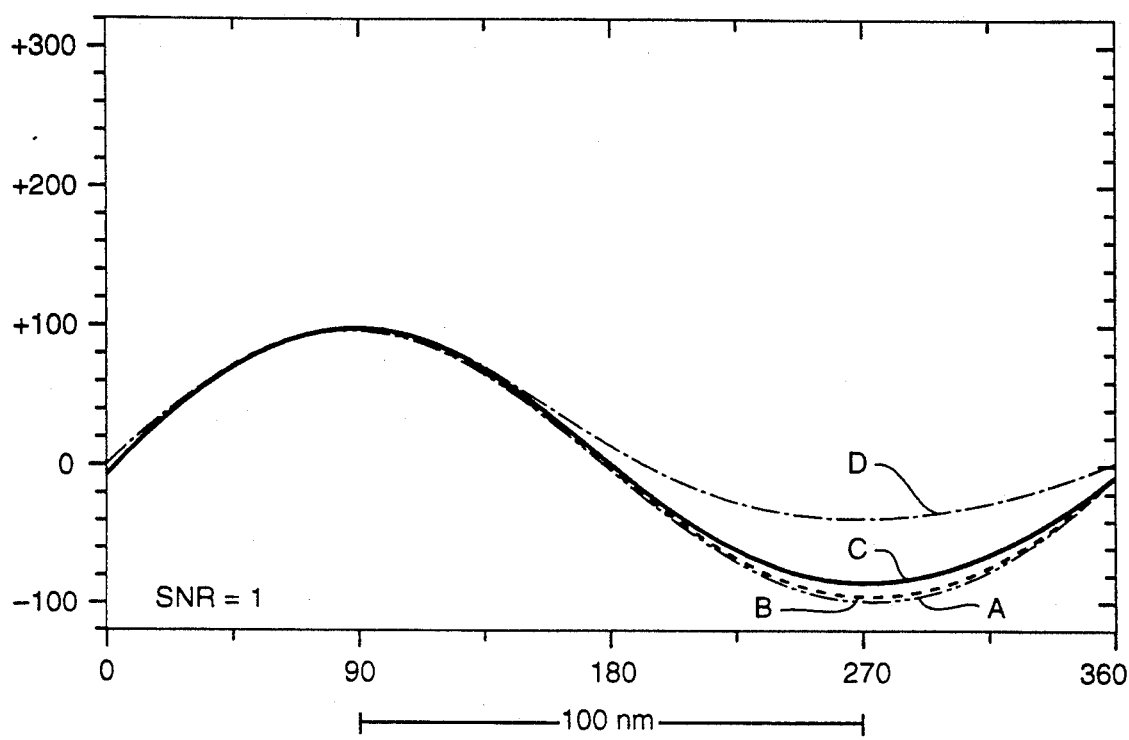
FIG._2
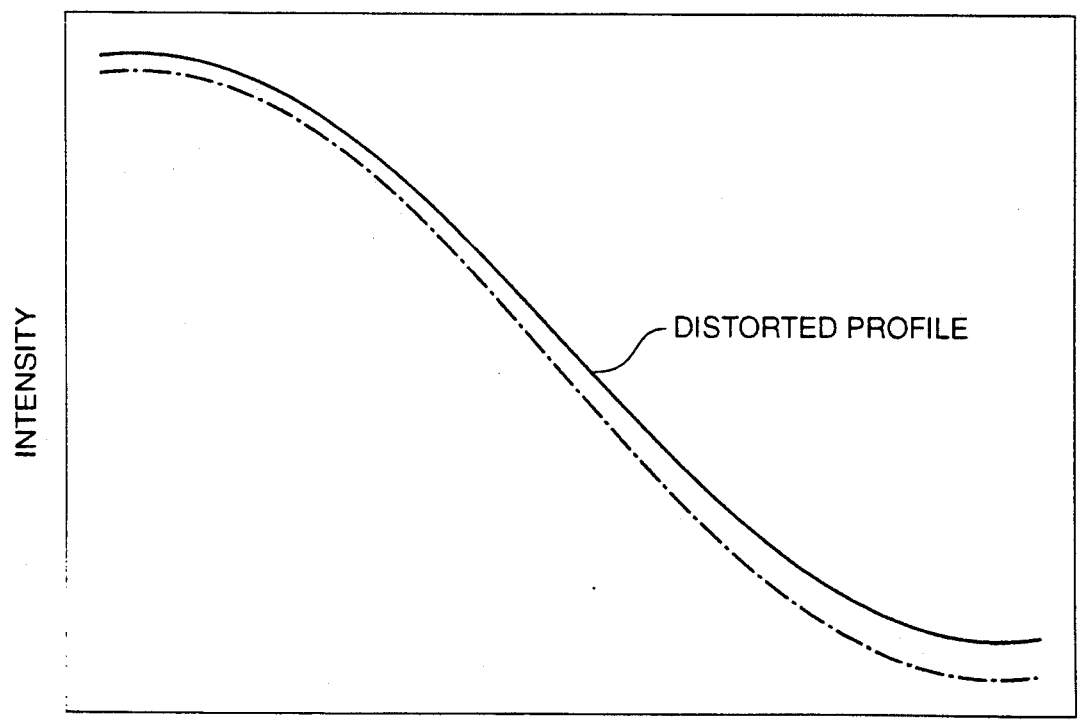
FIG._7

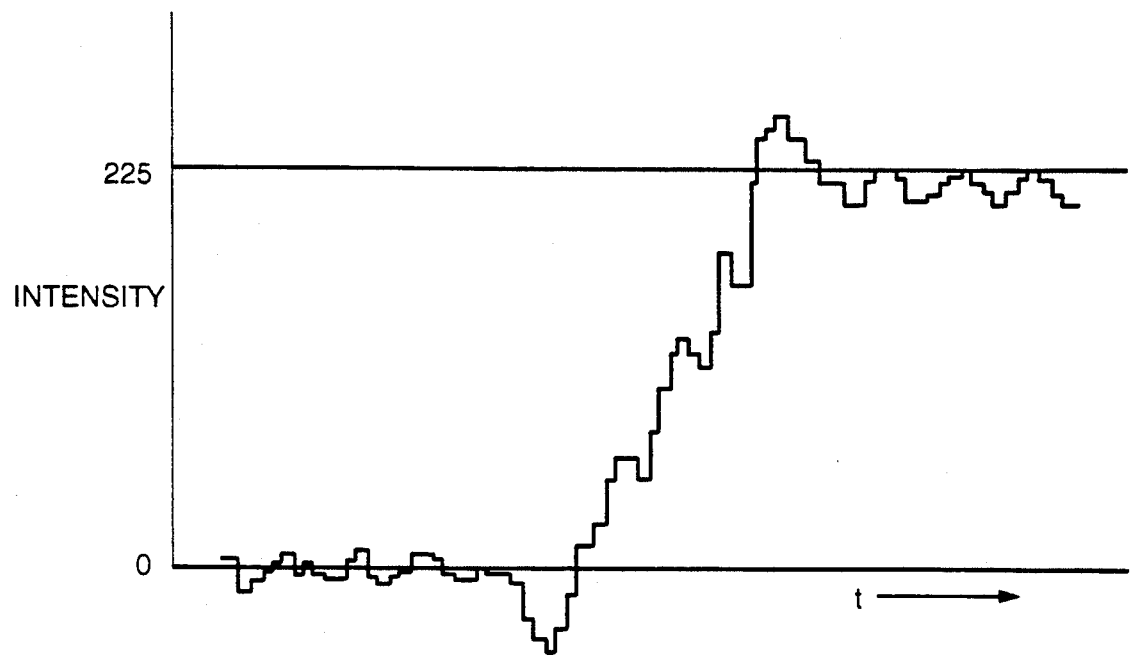
FIG._3A
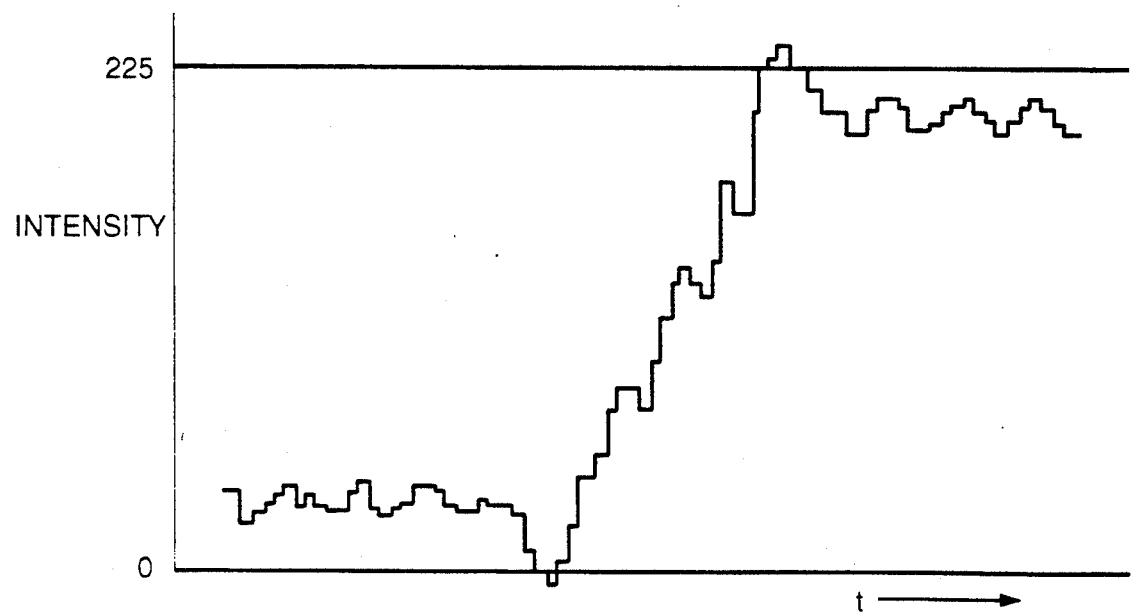
FIG._3B

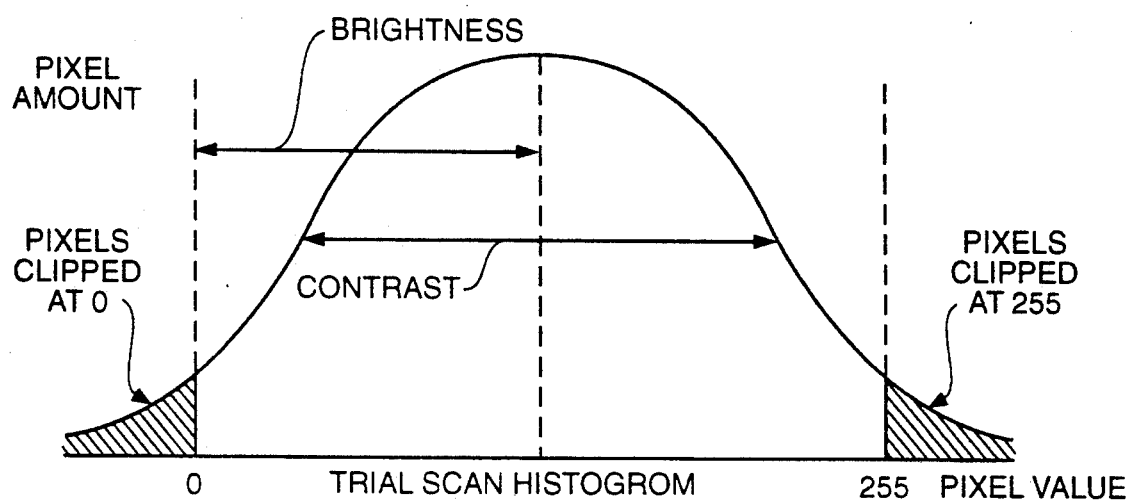
FIG._4
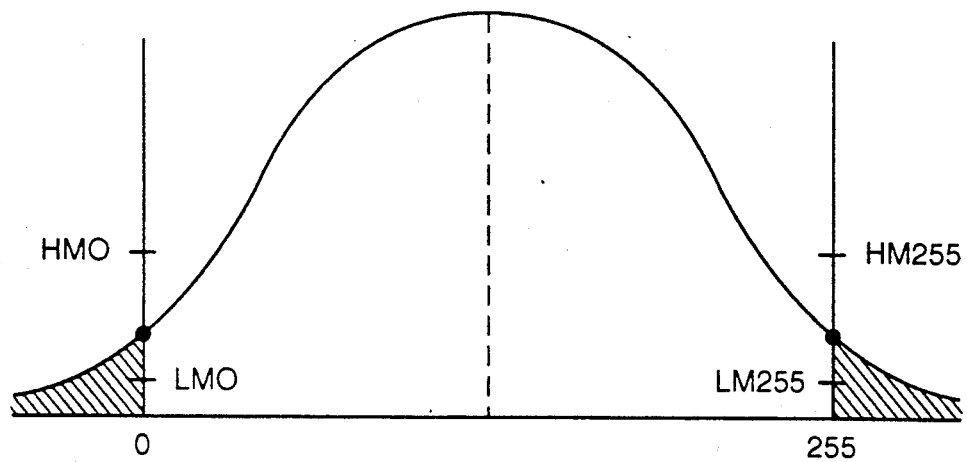
FIG._5

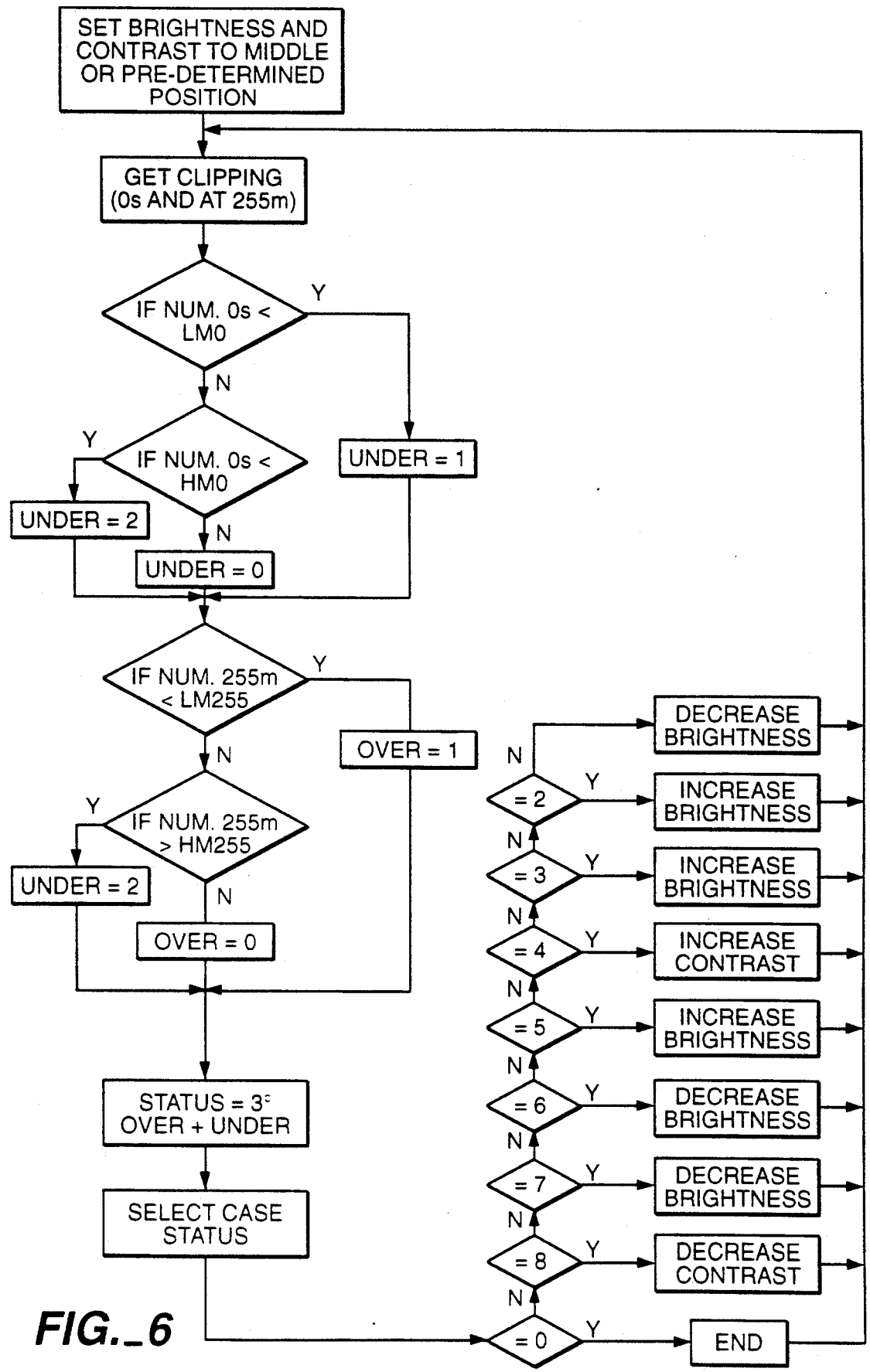
FIG._6

PRECISION MEASUREMENT USING PARTICLE BEAM DEVICES

BACKGROUND OF THE INVENTION

1. Field of the Invention

The present invention relates to particle beam metrology and more particularly to an arrangement for improving the precision of critical dimension measurements of objects, for example integrated circuit wafers, using an particle beam device such as a scanning electron microscope.

2. State of the Art

It is known to use electromagnetic systems in microscopes such as scanning electron microscopes (SEM) for measurement and inspection purposes. Scanning electron microscopes are often used in place of traditional optical microscopes for microelectronics inspection and metrology applications in semiconductor manufacturing. The metrology tools are often used, for example, for measuring patterns (e.g., critical dimensions) formed on semiconductor wafers during fabrication.

The short wavelengths of scanning electron microscopes have several advantages over conventionally used optical microscopes. For example, scanning electron microscopes can achieve resolutions from about 100 Å to 200 Å, while the limiting resolution of optical microscopes is typically about 2,500 Å. Further, scanning electron microscopes provide depths of field several orders of magnitude greater than optical microscopes. Despite the accuracy and precision of present scanning electron microscopes, enhanced instrument specifications and capabilities are required as parameters (e.g., critical dimensions) to be inspected come within the submicrometer ranges.

An article entitled "Microelectronics Dimensional Metrology in the Scanning Electron Microscope", Parts I and II, Solid State Technology by Michael T. Postek et al. (November 1986), describes a typical SEM wafer inspection instrument. As described therein, a focused electron beam is scanned from point to point on a specimen surface in a rectangular raster pattern. Accelerating voltage, beam current and spot diameter are optimized for the specific application and specimen composition.

As the scanning electron beam contacts the surface of a specimen, backscattered and/or secondary electrons are emitted from the specimen surface. Semiconductor inspection, analysis and metrology is performed by detecting these backscattered and/or secondary electrons. A point by point visual representation of the specimen is obtained on a CRT screen as the electron beam controllably scans the specimen.

Although known scanning electron microscopes are able to provide a resolution adequate for semiconductor manufacturing, several factors limit their resolution, or precision. For example, harmonic distortion introduced during signal acquisition and signal processing limits the precision of conventional SEMs to about 10-20 nm. Precision as used herein is defined in terms of the standard deviation of repeated measurements of a particular feature. In particular, precision is defined as six times the standard deviation, or $6\sigma$.

Accordingly, it would be desirable to provide an SEM or similar device with the capability of improved measurement precision. Particularly in the manufacture of VLSI devices, since projected technological advances are expected to lead to even further reduced geometries, increased precision is necessary as compared to the precision presently available in the known art. The present invention reduces harmonic distortion introduced during signal acquisition and signal processing, so as to improve by a factor of several times measurement precision.

SUMMARY OF THE INVENTION

According to one embodiment of the present invention, the precision of measurements of feature dimensions of objects using a particle beam device is improved by setting upper and lower signal reference levels and a signal offset level, performing a preliminary scan of the object using the particle beam device to produce a time-quantized and level-quantized signal indicative of a surface profile of the object, determining a percentage of time intervals during which the signal lies outside a range defined by the upper and lower signal reference levels, and adjusting at least one of the signal reference levels and the offset level such that the foregoing percentage becomes substantially equal to a predetermined percentage in a subsequent scan. In other words, the percentage of "outliers" in a profile, that is the number of pixels that exceed full scale in a video range, is limited to a predetermined percentage, for example one percent. Clipping distortion is therefore minimized.

In another embodiment of the present invention, multiple scans of the object are performed using the particle beam device to produce at each scan a time-quantized and level-quantized signal indicative of a surface profile of the object. A composite time-quantized and level-quantized signal is then produced by, for each time interval, determining as a level of the composite signal for that time interval a median level during a corresponding time interval of multiple ones of signals produced by the multiple scans. In other words, profile synthesis is performed using the median rather than the arithmetic mean as is commonly done. Influence of outliers on the synthesized profile is therefore reduced, reducing distortion.

BRIEF DESCRIPTION OF THE DRAWINGS

The present invention can be further understood with reference to the following description in conjunction with the appended drawings. In the drawings:

FIG. 1 is a block diagram of a scanning electron microscope that may be used in practicing the present invention;

FIG. 2 is a simulation plot showing distortion of a waveform for different amounts of clipping;

FIG. 3a is a profile signal having a number of outliers;

FIG. 3b is a profile signal having a specified percentage of outliers in accordance with the present invention;

FIG. 4 is a trial scan histogram of pixel values showing pixels clipped in relation to brightness and contrast;

FIG. 5 is a histogram showing clipping limits used to adjust brightness and contrast;

FIG. 6 is a flow diagram of a preferred method of adjusting brightness and contrast; and FIG. 7 is a comparative plot of a distorted profile, synthesized by averaging, and an undistorted profile.

DETAILED DESCRIPTION OF THE PREFERRED EMBODIMENTS

In FIG. 1, a particle beam device such as a scanning electron microscope 7 includes a voltage source 11. The voltage source 11 is connected to an electron source 13 that directs a narrow beam of highly accelerated electrons toward a specimen stage 18 via a plurality of electron lenses $L_1$, $L_2$ and $L_3$. In the illustrated embodiment, the electron beam is indicated by the dashed line 14. In a preferred embodiment, the electron beam is focused onto a wafer stage of the scanning electron microscope using an autofocus technique.

As further shown in FIG. 1, a cylindrical column 17 houses the electron source 13 and the lenses $L_1$, $L_2$ and $L_3$. The column 17 is normally referred to as an electron optical column and includes a chamber, indicated in the drawing as 17A, that surrounds and supports a specimen stage 18. Together, the optical column 17 and the chamber 17A represent the body of the scanning electron microscope.

The scanning electron microscope 7 of FIG. 1 further includes an electrostatic deflection system for selectively scanning the electron beam across specimen stage 18. In the illustrated embodiment, the deflection system includes four pairs of electron beam scanning coils, designated $D_1$ through $D_4$. The scanning coils are located within optical column 17 for focusing the electron beam on the surface of a specimen held on stage 18. In the illustrated embodiment, the pairs of deflection coils $D_1$ and $D_2$ are connected to sawtooth voltage generator 19, and the pairs of deflection coils $D_3$ and $D_4$ are connected to sawtooth voltage generator 20.

The electron beam scanning coils $D_1$ through $D_4$ deflect the electron beam 14 in two, generally perpendicular directions. In the drawing, the deflection directions are designated as the x-direction and y-direction, respectively. The x-direction and y-direction typically are in a plane perpendicular to the direction of beam 14, but strict orthogonality is not required. For present purposes, it can be assumed that coils $D_1$ and $D_3$ deflect the scanning beam in the x-direction and that coils $D_2$ and $D_4$ deflect the scanning beam in the y-direction.

An electron collector 22 is arranged near the surface of stage 18 which is exposed to beam 14. The electron collector is connected to an amplifier 23 which provides signals to an analog-to-digital converter 43 for transforming the collected electron current to digital signals which may be subsequently displayed on a video display 49.

In operation, sawtooth generators 19 and 20 provide time-varying voltage signals to electron beam scanning coils $D_1$–$D_4$ such that beam 14 is deflected across specimen stage 18 in a predetermined scanning pattern. The sawtooth generators 19 and 20 typically operate synchronously to drive the electron beam across stage 18 in the x-direction at a constant rate, with each scan being deflected in the y-direction to form a series of generally parallel scanning lines.

During operation of the FIG. 1 scanning electron microscope, collector 22 detects changes in the electron current at stage 18. Thus, as the electron beam scans a specimen on stage 18, changes in the composition, texture and topography of the specimen cause amplitude variations of the electron current detected by collector 22. With each complete scanning sequence, an image corresponding to features of the specimen surface can be created.

Referring still to FIG. 1, a signal acquisition chain of the scanning electron microscope includes the detector 22, the amplifier 23 and the A/D converter 43. A digital signal processor 45 is connected to the output of the A/D converter 43 and is used to "clean up" signals produced by the signal acquisition chain. In particular, the digital signal processor performs profile synthesis in which several profiles are combined and performs post processing on the resulting synthesized profile, to further improve the profile. As used herein, "profile" refers to a time-quantized and level-quantized signal indicative of an object's surface profile and obtained in the presently-described embodiment by processing an output signal of the collector 22. The final profile is sent to a video controller 47 for display on the video display 49. A controller 41 controls the sawtooth generators 19 and 20 and is supervised by the digital signal processor 45.

In conventional methods, contrast and brightness of an image displayed on the video display 49 are typically adjusted by a viewer to give a clear, sharp image. Contrast refers to available signal range between a video black level and a video white level. Brightness refers to biasing of a video signal at some level in between the video black and the video white levels. In the prior art, user-adjusted brightness and contrast controls have directly affected signal acquisition. In particular, contrast and brightness adjustment has affected harmonic distortion during signal acquisition. Automatic control of brightness and contrast is known for the purpose of enhancing image display, again without regard for harmonic distortion during signal acquisition.

In practice, contrast and brightness settings that result in a clear, sharp image on the video display 49 may also result in significant harmonic distortion during signal acquisition with the result that, although sharp images are obtained, measurement results are obtained that are of far lower precision than theoretical results indicate should be the case.

The harmonic distortion that results from contrast and brightness control that is proper for purposes of a sharp display but improper for purposes of precise measurements is a product of clipping of the signal. Clipping occurs when the signal goes above or below the video black and white levels. Display pixels corresponding to portions of the signal which fall outside the video reference levels are referred to as "outliers". Study has shown that when the video display is adjusted for best viewing, as many as 20% of the pixels are outliers. In other words, clipping of up to 20% is commonly accepted without considering the adverse effect on measurement precision.

The effect of clipping on measurement precision may be appreciated from the simulation plot of FIG. 2. In the simulation, the bottom half of a sinusoidal signal having a signal to noise ratio of 1 was clipped, specifying various percentages of clipping. A half cycle of the sinusoid was arbitrarily assigned a length of 100 nm. A simulated profile labelled A corresponds to 0% clipping, B (barely distinguishable in the Figure from A) corresponds to 10% clipping, C corresponds to 20% clipping, and D corresponds to 40% clipping. The results of the simulation are set forth in Table 1 below:

TABLE 1

| CLIPPING (% of total signal S + N): | | | | | | | | |
|---|---|---|---|---|---|---|---|---|
| 0% | 1% | 2% | 3% | 4% | 5% | 10% | 20% | 40% |
| DISTANCE BETWEEN THRESHOLD CROSSINGS (pixels): | | | | | | | | |

TABLE 1-continued

|      | | | | | | | | | |
|------|-----|-----|-----|-----|-----|-----|-----|-----|-----|
| 5%:  | 244 | 244 | 243 | 243 | 243 | 243 | 241 | 239 | 227 |
| 10%: | 233 | 233 | 232 | 232 | 232 | 232 | 230 | 226 | 213 |
| 25%: | 210 | 209 | 209 | 209 | 209 | 209 | 208 | 202 | 189 |
| 50%: | 180 | 179 | 179 | 179 | 179 | 179 | 178 | 175 | 162 |
| 75%: | 150 | 149 | 149 | 149 | 149 | 150 | 149 | 147 | 138 |
| 90%: | 126 | 126 | 126 | 126 | 127 | 126 | 126 | 124 | 120 |
| 95%: | 115 | 115 | 115 | 115 | 116 | 115 | 115 | 114 | 111 |

SHIFT (−nm):

|      | | | | | | | | | |
|------|------|------|------|------|-------|------|------|------|-------|
| 5%:  | 0.00 | 0.00 | 0.56 | 0.56 | 0.56  | 0.56 | 1.67 | 2.78 | 9.44  |
| 10%: | 0.00 | 0.00 | 0.56 | 0.56 | 0.56  | 0.56 | 1.67 | 3.89 | 11.11 |
| 25%: | 0.00 | 0.56 | 0.56 | 0.56 | 0.56  | 0.56 | 1.11 | 4.44 | 11.67 |
| 50%: | 0.00 | 0.56 | 0.56 | 0.56 | 0.56  | 0.56 | 1.11 | 2.78 | 10.00 |
| 75%: | 0.00 | 0.56 | 0.56 | 0.56 | 0.56  | 0.00 | 0.56 | 1.67 | 6.67  |
| 90%: | 0.00 | 0.00 | 0.00 | 0.00 | −0.56 | 0.00 | 0.00 | 1.11 | 3.33  |
| 95%: | 0.00 | 0.00 | 0.00 | 0.00 | −0.56 | 0.00 | 0.00 | 0.56 | 2.22  |

To measure a linewidth, a threshold is specified in terms of a percentage (5%, 10%, 25%, etc.) of a peak-to-peak signal level. A point at which the threshold is first reached is taken as the beginning of the feature and a point at which the threshold is next crossed is taken as the end of the feature. For each value of clipping, specified across the top of Table 1, distance between the threshold crossings at different specified signal thresholds was calculated in terms of pixels, and the corresponding horizontal shift of the threshold crossings was calculated in nanometers. Each pixel is assumed to correspond to one degree of the sinusoid. Therefore, 180 pixels spans 100 nm.

To take a specific example, if the mid-point of the sinusoid (50%) were chosen for purposes of defining a line-width, attention being confined to the last half cycle of the sinusoid to which clipping has been applied, then 0% clipping would result in a line-width of 180 pixels corresponding to the 180 degrees of the last half cycle of the sinusoid. Clipping of up to 5% gives a line-width measurement of 179, one pixel (0.56 nm) less than with no clipping. At 40% clipping, the line-width is reduced to 162 pixels, a reduction of 10 nm. At 20% clipping, typical for brightness and contrast values used to give a sharp display, the average line-width shift ($\sigma$) is 2.46 nm, giving a resolution ($6\sigma$) of about 15 nm.

As the signal to noise ratio increases making possible increased resolution, perversely, the effect of outliers increases as well, at least partially negating the increase in resolution. At a signal to noise ratio of 2, for example, 20% clipping results in an average line-width shift of 15.32 nm as compared to 2.46 nm for a signal to noise ratio of 1. The shift is most severe at lower threshold values. For example, at a 5% threshold as would be used to measure the base of a structure, for example, the simulated line-width shift is 30 nm. This systematic error is effectively randomized when contrast and brightness settings are adjusted from set-up to set-up according to individual viewing preferences.

In one embodiment of the present invention, distortion resulting from clipping is minimized by adjusting contrast and brightness so as to limit the number of outliers in a profile to a specified small percentage, for example 1%. If the resulting image were to be displayed directly using these brightness and contrast settings, the image may not be as clear or sharp as desired. Image enhancement techniques such as gamma correction and non-linear contrast enhancement may be used, however, to produce a display image comfortable for viewing.

Referring again to FIG. 1, the digital signal processor 45 produces contrast and brightness control signals 46 and 48, which are applied to the video amplifier 23 so as to minimize clipping. A preliminary scan of the object is first made, resulting in a preliminary profile from which the digital signal processor 45 determines the percentage of outliers. The digital signal processor 45 then adjusts the contrast and brightness signals 46 and 48 so as to limit the number of outliers to a predetermined percentage of all pixels.

The DSP produces the contrast and brightness levels by an iterative process that is based upon analysis of the pixel values (histogram) of trial scans. FIG. 4 shows a typical histogram of pixel values for a trial scan. Contrast, brightness and clipped pixels are indicated graphically on the histogram.

To produce the proper contrast and brightness levels, first, four parameters are set describing the minimum and maximum amount (in %) of allowed clipped pixels at 0 and at 255, respectively (LM0, HM0, LM255, HM255) as shown in FIG. 5.

Then, by successive iterations the DSP measures the amount of pixels clipped both at 0 and at 255 and modifies the contrast and brightness settings following a certain algorithm in a loop, until the clipped values fall within the LM0 and HM0 range for pixels clipped at 0, and within the LM255 and HM255 range for pixels clipped at 255.

The algorithm used (a preferred embodiment) is shown in the flow diagram of FIG. 6. It is based on setting two variables called "under" and "over". They are set according to the following criteria:

| Pixels clipped at 0 (%) | under | Pixels clipped at 244 (%) | over |
|---|---|---|---|
| >HM0 | 2 | >HM255 | 2 |
| <LM0 | 1 | <LM255 | 1 |
| >LM0 and <HM0 | 0 | >LM255 and <HM255 | 0 |

Then, a combination variable called "status" is determined using the equation:

$$status = 3*over + under$$

Then, given the value of "status" a contrast and/or brightness increase/decrease is done for that particular iteration according to the following table:

| under | over | status | action |
|---|---|---|---|
| 0 | 0 | 0 | Stop |
| 1 | 0 | 1 | Decrease brightness |
| 2 | 0 | 2 | Increase brightness |
| 0 | 1 | 3 | Increase brightness |
| 1 | 1 | 4 | Increase contrast |
| 2 | 1 | 5 | Increase brightness |
| 0 | 2 | 6 | Decrease brightness |
| 1 | 2 | 7 | Decrease brightness |
| 2 | 2 | 8 | Decrease contrast |

The increment/decrement values are pre-determined experimentally. For example, a value of 1 may be used for the step size initially. Depending on the time required to bring the system within the desired limits, the step size may be increased to a greater value.

Also, the increment/decrement values can change dynamically given the number of consecutive times "status" has the same value. For example, if the DSP three consecutive times calculates "status" of 2 (increase brightness) it may decide to increase by a factor of two of the prior increment. This dynamic change is done so as to increase the speed of the algorithm.

The effect of the foregoing process is illustrated in FIGS. 3a and 3b. The figures show a profile plotted on a video scale from 0 to 255, 0 representing black, for example, and 255 representing white. In FIG. 3a, a high percentage of outliers occurs. Although the signal may be used to produce a display image that has a pleasing appearance (features distinct and readily distinguishable), measurements based on the image will be imprecise as a result of harmonic distortion introduced by clipping. In FIG. 3b, the number of outliers is limited to a small predetermined percentage, for example 1%. Although the signal, if displayed directly, may not produce as pleasing a display image, measurements based on the image are more precise, usually by a factor of several times, than when a high percentage of outliers occurs.

In another embodiment of the present invention, an advantageous form of profile synthesis is performed so as to result in more precise measurement. In profile synthesis, several time and space adjacent profiles are combined to increase the ratio S/N. Conventionally, profile synthesis is most often performed by taking the arithmetic mean of corresponding pixels of several profiles. The arithmetic mean is simple to calculate, resulting in implementations that are fast and inexpensive. Use of the arithmetic mean entails significant disadvantages, however. Use of the arithmetic mean assumes normality and is non-robust. In particular, the arithmetic mean exhibits a high sensitivity to outliers.

FIG. 7 illustrates an example of distortion introduced by profile synthesis using the arithmetic mean. Ten thousand profiles each having a signal-to-noise ratio of 1 and each having 5% of the pixels being outliers to full scale were averaged to produce a combined profile. As can be seen in FIG. 4, averaging produced a significantly distorted profile as compared to a profile synthesized the same way but from profiles having no outliers (0% clipping).

Instead of using the arithmetic mean to perform profile synthesis, in an alternate embodiment of the present invention, the median is used instead, reducing sensitivity to outliers. The computational load of the digital signal processor 45 is increased. However, the computational power of digital signal processors continues to increase rapidly.

Using the described arrangement and techniques, harmonic distortion during signal acquisition and signal processing in particle beam devices such as SEMs may be significantly reduced. Measurement precision is improved to a corresponding degree.

While the foregoing description has discussed preferred embodiments it will be readily apparent to those skilled in the art that beams other than electron beams can be used in the scanning microscope. For example, other beams such as ion, photon and X-ray beams can be used.

Further, it will be appreciated that while preferred embodiments have been described which include the use of a scanning electron microscope to perform semiconductor metrology applications, the invention will be useful for any technology where high image resolution and extreme precision are required or desired. For example, the present invention is equally applicable to micromachining, medical image calibration, integrated circuit lithography, overlay analysis on step-and-repeat optical lithography tools, electron beam lithography tools and x-ray lithography tools.

Although the present invention has been described in its preferred embodiments, those skilled in the art will appreciate that alternate embodiments, not specifically described may be selected without departing from the spirit and scope of the invention, which is defined in the appended claims.

What is claimed is:

1. A method of improving the precision of measurements of feature dimensions of objects using a particle beam device, comprising the steps of:
    setting upper and lower signal reference levels and a signal offset level;
    performing a preliminary scan of said object using said particle beam device to produce a time-quantized and level-quantized signal indicative of a surface profile of said object;
    determining a percentage of time intervals during which said signal lies outside a range defined by said upper and lower reference level; and
    adjusting at least one of said signal reference levels and said offset level such that said percentage is made substantially equal to a predetermined percentage during a subsequent scan.

2. The method of claim 1 wherein said predetermined percentage is 5%.

3. The method of claim 1 wherein said predetermined percentage is 1%.

4. A particle beam device for obtaining precise measurements of feature dimensions of objects, said device comprising:
    means for setting upper and lower signal reference levels and a signal offset level;
    means for producing a particle beam;
    means for performing a preliminary scan of said object using said particle beam to produce a time-quantized and level-quantized signal indicative of a surface profile of said object;
    means for determining a percentage of time interval during which said signal lies outside a range defined by said upper and lower signal reference levels; and
    means for adjusting at least one of said signal reference levels and said offset level such that said percentage is made substantially equal to a predetermined percentage during a subsequent scan.

5. A method of improving the precision of measurements of feature dimensions of objects using a particle beam device, comprising the steps of:
    performing multiple scans of said object using said particle beam device, producing at each scan a time-quantized and level-quantized signal indicative of a surface profile of said object; and
    producing a composite time-quantized and level-quantized signal by, for each time interval, determining as a level of said composite signal for that time interval a median level during a corresponding time interval of multiple signals produced by said multiple scans.

6. A particle beam device for performing precise measurement of feature dimensions of objects, said device comprising:
    means for producing a particle beam;
    means for performing multiple scans of said object using said particle beam, producing at each scan a time-quantized and level-quantized signal indicative of a surface profile of said object; and
    means for producing a composite time-quantized and level-quantized signal by, for each time interval, determining as a level of said composite signal for that time interval a median level during a corresponding time interval of multiple signals produced by said multiple scans.

* * * * *